Sept. 19, 1933.  C. P. SMITH  1,927,576
HANDLE AND BRAKE FOR FISHING ROD REELS
Filed Sept. 7, 1932
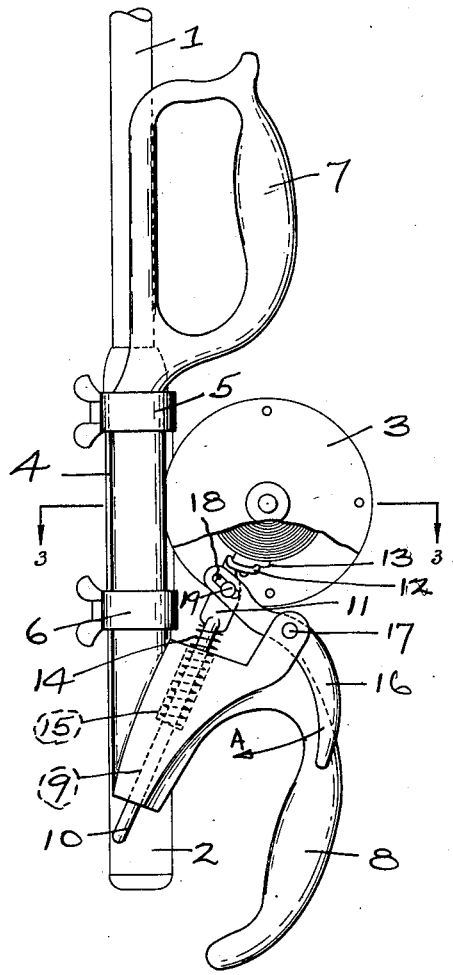
Fig-1-
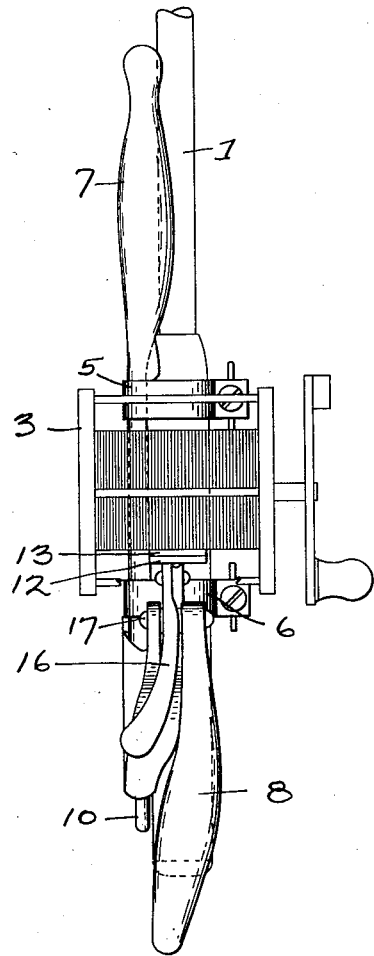
Fig-2-
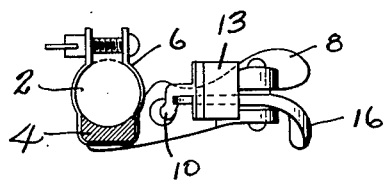
Fig-3-
INVENTOR.
CHARLES P. SMITH
BY Lincoln Johnson
ATTORNEY Patented Sept. 19, 1933

1,927,576

UNITED STATES PATENT OFFICE 1,927,576

HANDLE AND BRAKE FOR FISHING ROD REELS

Charles P. Smith, San Rafael, Calif.

Application September 7, 1932. Serial No. 632,001

3 Claims. (Cl. 242—84.5)

This invention relates particularly to an auxiliary handle member to be detachably secured to the handle of a fishing rod, and having a brake mechanism on said auxiliary handle for controlling and/or stopping the rotation of the reel having the fishing line thereon.

An object of the invention is to provide a balanced auxiliary handle to be mounted on the handle of a fishing rod, which handle is provided with a pair of independent hand grips, either or both of which may be used when a cast is being made, and for reeling in or paying out the line; the weight of the respective hand grips being so proportioned that the same will balance the fishing rod in the hands of the user.

A further object of the invention is to provide an attachment for the handle of a fishing rod, which attachment is provided with a brake member thereon to be moved manually into and from frictional engagement with the circumference of the line wound on the conventional fishing line reel, to control the speed at which the reel may unwind, and to provide a brake which may be used to hold the reel against rotation at any selected time.

Other objects and advantages are to provide a handle and brake for fishing rod reels that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawing:

Fig. 1 represents a side elevation of a fishing rod with a reel thereon, illustrating an auxiliary handle with a manually operable brake thereon constructed in accordance with my invention, detachably secured to the handle of the fishing rod.

Fig. 2 is a front elevation of Fig. 1.

Fig. 3 is a cross section taken through Fig. 1, on the line 3—3.

In detail the construction illustrated in the drawing comprises a fishing rod generally designated by the numeral 1, having an enlarged handle 2 formed on an end thereof. A conventional type of reel 3 for the fishing line is clamped, or otherwise held, onto the rod handle.

An auxiliary handle 4 is arranged alongside of the handle 2 of the rod and clamped thereto by the spaced ring clamping members 5 and 6. The ring clamps 5 and 6 frictionally bind around the outside of the rod handle to permit the auxiliary handle 4 to be adjusted or placed at any desired point on the rod handle 2.

The forward end of the auxiliary handle 4 is provided with a hand grip 7, and the rearward end of the auxiliary handle 4 is provided with a hand grip 8. The forward hand grip 7 is spaced away from the extreme end of the handle 2 on the rod, thus affording a counterbalanced placement of the hand grip 7 relative to the rod 1 for either ease in casting or for reeling in.

Where the hand grip 7 is held with the line being reeled in, the operator may easily distribute the line onto the reel in a uniform manner so that there will be no building up of the line on certain portions of the reel spool.

The rear hand grip 8 is provided with a cavity 9 therein, the axis of which extends toward the line reel 3. A plunger 10 is reciprocatingly mounted in the cavity 9, said plunger having a shoulder 11 thereon adjacent the reel. The extreme end of the shoulder 11 is provided with a curved member 12 thereon, the curvature of which approximately corresponds to the periphery of the reel 3. A pad 13 of braking material, such as leather, fiber, or the like, is attached to the member 12 and is adapted to bear against the line on the reel. An expansion spring 14 is interposed between the shoulder 11 on the plunger 10 in an enlarged recess 15 in the cavity 9 for the purpose of maintaining the end of the plunger 10 in contact with the line on the reel.

In order to regulate the contact of the plunger 10 with the line on the reel, I have provided a finger operated lever 16 which is pivoted midway between its ends as at 17, to a forward portion of the hand grip 8. An end of the finger lever 16 is slotted at 18, and is slidably guided on a pin 19 mounted on the plunger. The finger lever 16, when it is pressed in the direction of the arrow A, causes the braking plunger 10 to be urged into contact with the line on the reel and to thus retard rotation of the said reel. The amount of pressure or braking effort to be exerted by the braking plunger 10 on the reel may be manually regulated in accordance with the amount of pressure applied by the finger. The braking plunger 10 contacts the line on the reel in such a manner that the line may be readily wound onto the reel without the necessity of freeing the said braking member from contact with the said reel, and which action also permits an equal and uniform distribution of the line on the reel.

The brake pad 13 contacts the line on the reel at a point on the rear side thereof to permit free unreeling of the line, yet to prevent any "back-lashing" action of the line as it is unwound from the reel.

In casting or paying out the line from the reel, the finger is removed from the lever 16 so that the line will come off the reel freely, and a cast of line may be stopped at any desired distance by engaging the brake with the reel. When a cast is being made and the line is unreeling, the brake plunger engages the line unwound from the reel and the spring behind the plunger prevents any "back-lashing" or tangling of the line as it comes off of the reel.

It is customary practice in casting fishing lines at the present time, to regulate the length of cast by the fingers. This is not satisfactory due to the fact that a fast moving line is apt to burn the fingers. With my apparatus this is entirely eliminated, and a very accurate handling of the line is possible. Where a fish would be caught and attempted to run away, the operator could slow up the paying out of the line in a gradual manner so as to bring the fish to a stop without any possibility of the line burning the fingers, or otherwise causing any discomfort thereto. The tension of the spring behind the brake plunger is relatively great when the reel is full of line, and relatively light when the reel is empty of line, so that by reason of its contact with the line on the reel, the tension on the brake decreases as the line from the reel is paid out, and increases as the line is wound in.

Having thus described this invention, what I claim and desire to secure by Letters Patent is:

1. In combination, a fishing rod; a line reel on the handle portion of said rod; and means to retard rotation of the line reel, including a hand grip, detachably connected to the rod handle; a brake member reciprocatingly mounted in the hand grip; and a lever pivoted to the hand grip and slidably pivoted to the brake member to move the brake member relative to the line reel.

2. An auxiliary handle for a fishing rod having a reel thereon, comprising a hand grip attachable to the fishing rod handle; a plunger axially slidable in said hand grip; a pad on an end of said plunger in contact with the reel; a spring to urge said plunger pad into contact with the reel; and a lever pivoted to the hand grip and slidably pivoted to the plunger to engage or disengage the plunger pad from the reel.

3. In combination, a fishing rod; a line reel on the handle portion of said rod; means to retard rotation of the line reel, including a hand grip, detachably connected to the rod handle; and a brake member reciprocatingly mounted in the hand grip, and frictionally engaging the line wound on the reel, to permit free unreeling of the line from the reel and to prevent "back-lash" of the line as it is unwound from the reel and a lever pivoted to the hand grip and slidably pivoted to the brake member to engage the brake member with the reel.

CHARLES P. SMITH.